United States Patent
Nagoria et al.

(10) Patent No.: US 8,819,636 B2
(45) Date of Patent: Aug. 26, 2014

(54) TESTING COMPATIBILITY OF A COMPUTER APPLICATION

(75) Inventors: Nitin Harvadan Nagoria, Bangalore (IN); Shiva Sm Prakash, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 13/070,499

(22) Filed: Mar. 24, 2011

(65) Prior Publication Data

US 2011/0321014 A1    Dec. 29, 2011

(30) Foreign Application Priority Data

Jun. 23, 2010  (IN) .......................... 1773/CHE/2010

(51) Int. Cl.
*G06F 9/44*    (2006.01)

(52) U.S. Cl.
USPC .......................................................... 717/125

(58) Field of Classification Search
None
See application file for complete search history.

(56) References Cited

U.S. PATENT DOCUMENTS

| | | | | |
|---|---|---|---|---|
| 6,195,765 B1 * | 2/2001 | Kislanko et al. | ............. | 714/38.1 |
| 7,353,439 B2 * | 4/2008 | Lin | ................ | 714/724 |
| 7,519,630 B2 * | 4/2009 | Brown et al. | ........................ | 1/1 |
| 7,634,767 B2 * | 12/2009 | Huang et al. | ................. | 717/151 |
| 7,849,460 B1 * | 12/2010 | Martin et al. | ................. | 717/174 |
| 8,423,981 B2 * | 4/2013 | Hudson et al. | ................ | 717/140 |
| 2002/0188701 A1 * | 12/2002 | Brown et al. | ................ | 709/220 |
| 2004/0015961 A1 * | 1/2004 | Chefalas et al. | ............ | 717/178 |
| 2004/0044693 A1 * | 3/2004 | Hadley et al. | ............... | 707/200 |
| 2004/0064571 A1 * | 4/2004 | Nuuttila | ........................ | 709/229 |
| 2005/0055665 A1 * | 3/2005 | Woo et al. | ..................... | 717/101 |
| 2005/0132334 A1 * | 6/2005 | Busfield | ........................ | 717/124 |
| 2005/0188116 A1 * | 8/2005 | Brown et al. | .................... | 710/8 |
| 2006/0161895 A1 * | 7/2006 | Speeter et al. | ............... | 717/121 |
| 2006/0179118 A1 * | 8/2006 | Stirbu | .......................... | 709/217 |
| 2007/0038993 A1 * | 2/2007 | Corpening et al. | ........... | 717/174 |
| 2007/0250621 A1 * | 10/2007 | Hillier | .......................... | 709/224 |
| 2009/0199047 A1 * | 8/2009 | Vaitheeswaran et al. | ........ | 714/47 |
| 2009/0265687 A1 * | 10/2009 | Dhanakshirur et al. | ....... | 717/121 |
| 2011/0072505 A1 * | 3/2011 | Ott | .................................. | 726/11 |
| 2011/0321014 A1 * | 12/2011 | Nagoria et al. | ............... | 717/125 |

OTHER PUBLICATIONS http://jamesmccaffrey.spaces.live.com/blog/cns!504C7CC53E7E7FE8!979.entry Publication Date: Jan. 31, 2009.

* cited by examiner

*Primary Examiner* — Don Wong
*Assistant Examiner* — Hossain Morshed
(74) *Attorney, Agent, or Firm* — Sumit Dhingra

(57) ABSTRACT

Presented is a method, system, computer readable instructions executable code and computer storage medium for testing compatibility between a computer application and a target computer platform. Configuration parameters of a computer application are provided to a computer system for comparison against a database to determine whether the configuration parameters of the computer application and the configuration parameters of a target computer platform are compatible or incompatible.

13 Claims, 4 Drawing Sheets

TESTING COMPATIBILITY OF A COMPUTER APPLICATION

RELATED APPLICATION

Benefit is claimed under 35 U.S.C. 119(a)-(d) to Foreign application Serial No. 1773/CHE/2010, filed in INDIA entitled "TESTING COMPATIBILITY OF A COMPUTER APPLICATION" by Hewlett-Packard Development Company, L.P., filed on Jun. 23, 2010, which is herein incorporated in its entirety by reference for all purposes.

BACKGROUND

Computing systems have come a long way in terms of usage. From being confined to research and development units of universities and large corporations, computers have become mass market products, like televisions, radios, etc. Also, gone are the days when a user had to learn a programming language as an interface to a computing machine. With the arrival of rich and interactive user interfaces, a user has a multitude of new age options (touch, gesture, etc.) available these days on how he or she chooses to interact with a computer system. Further, the size of a system itself has undergone a sea change in terms of portability. With handheld computers increasingly becoming affordable, the manufacturers are rushing to come out with better and more attractive devices. All this has led to a huge demand for novel and useful computer applications or products.

Hundreds of new computer applications are getting released each year by individual contributors, small and medium enterprises, and large software vendors. These applications range from a simple calculator for an average user to a large identity management software for a network or database administrator. Some of them are available free of cost for downloading from the internet, the others could cost hundreds of dollars. Also, these applications may be built upon an open source platform or a proprietary technology.

With increase in diversity of computer applications and hardware combinations on offer, most large software vendors try to develop and release more than one flavor of their products. For example, a software vendor may have to release different versions of an application for it to run on a variety of computer platforms, including different kinds of operating systems, such as a Mac operating system, Linux operating system, a Windows operating system, etc. In such scenario, testing the compatibility of a computer application with a computer platform is an aspect that is considered prior to release of the computer application to avoid any issues later on.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

For clarity and convenience, the following definition is used herein:

The term "computer platform" refers to a combination of software and/or hardware architecture that serves as a base for running a software or computer application. It may typically include a computer's architecture, operating system, programming and user interfaces, etc.

The demand for computer systems over the years has led many vendors to release a variety of computer platforms. These platforms may range from a simple GUI based operating platform for an average home user to complex computing systems that deploy advanced operating systems, multiple computer applications and complex computer architectures. Windows XP and Mac OS operating system (OS) based computer systems are familiar to average users. There are other computer systems, such as those based on Windows NT, Unix operating systems that are mostly used by enterprise customers. Since each of these platforms is different from each other, the features and applications supported by them may vary. This presents an interesting challenge to a software vendor or developer.

While developing a computer application, a software vendor may need to be mindful of the specification for each of the computer platforms it expects its application to run on. Since each computer platform may have a unique operating system, computer applications, hardware and user interface environment, the vendor may need to ensure that its application is compatible with a computer platform. This may not be easy. The problem is further compounded by the fact that a vendor may be obligated to provide support on various operating systems running on different architectures. Since a typical computer application or product may be required to be supported on an average of last three versions of each operating system, the application may have a long list of platform support matrix (OS*supported versions *architecture). This may result in increased compatibility testing efforts and associated costs due to a large number of platforms to support.

Embodiments of the present solution provide method, system, computer executable code and computer storage medium for testing compatibility between a computer application and a computer platform.

Embodiments of the present solution aim to provide a method for testing of a computer application for compatibility with multiple computer platforms.

Figure 1:
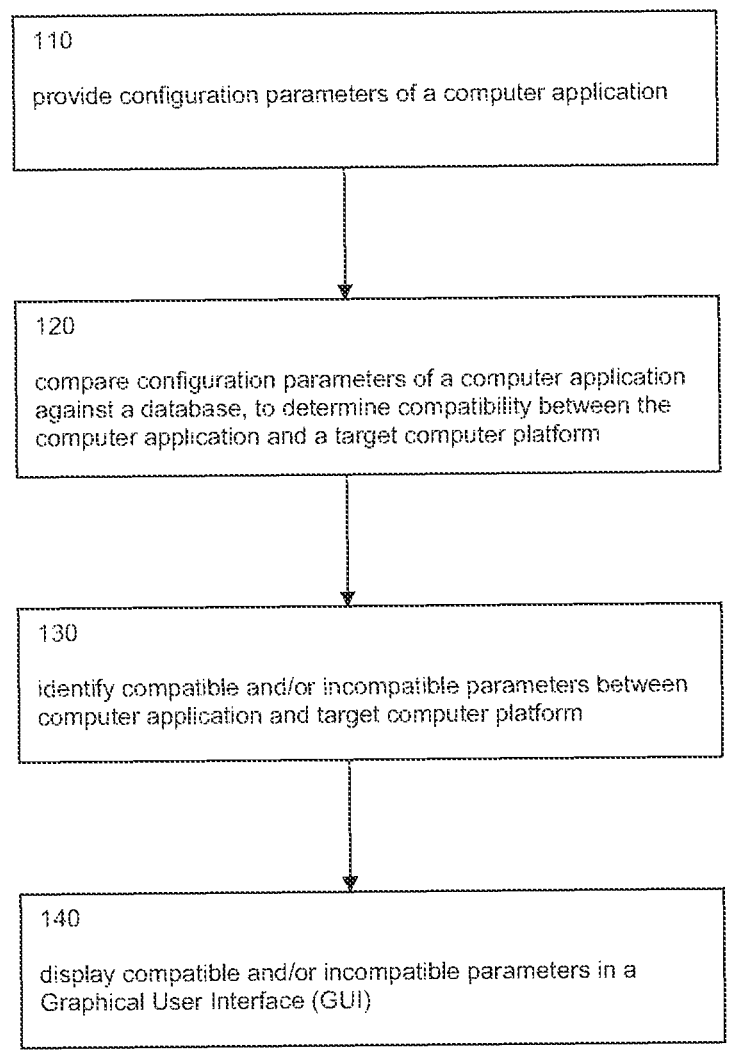
FIG. 1 shows a flow chart of a computer-implemented method of testing compatibility between a computer application and a computer platform according to an embodiment.

FIG. 1 shows a flow chart of a computer-implemented method of testing compatibility between a computer application and a computer platform according to an embodiment.

In step 110, a computer application, which is to be tested for compatibility with a pre-identified or target computer platform, is selected. Upon selection, at least one configuration parameter(s) of the computer application are obtained from its binary version. Configuration parameters are a set of parameters that may be needed for a computer application or product to perform effectively. For example, each computer application may include a set of configuration parameters related to its operating system (OS). In an embodiment, operating system parameters are obtained from the product binary (built on a particular platform) of the computer application. The configuration parameters of the computer application are provided to a computer system.

In step 120, the configuration parameters of the computer application are compared against a database, to determine whether the configuration parameters of the computer application and the configuration parameters of the target computer platform are compatible or incompatible.

The database comprises configuration parameters for a plurality of computer platforms including the configuration parameters of a target computer platform against which the application is to be tested for compatibility. In an embodiment, the configuration parameters are operating system (OS) parameters for plurality of computer platforms including the target computer platform. In this case, the database may be termed as Operating System Configuration Database (OSCDB). The configuration parameters of the operating system may include operating system name, version, patch level, system call table, OS libraries and symbols, system variables, system limits, system header files with data structure information, etc.

In an embodiment, the method may receive and store configuration parameters, related to computer platforms, in the database, prior to the comparison in step 120. The method may receive and store configuration parameters for any number and type of computer platforms, as desired by a user. The database may be regularly updated with configuration parameters of a plurality of computer platforms, including the target computer platform.

The step (120) compares configuration parameters of a selected computer application with the configuration parameters of a target computer platform to test their compatibility or incompatibility. A set of pre-defined criteria or values, which may be user defined, may be used to determine whether the configuration parameters of the computer application and the target computer platform are compatible or incompatible. The pre-defined criteria or values may be user or system defined.

In an embodiment, the method step (120) uses an interface between the database and the computer application, to extract configuration parameters from the computer application and validate those parameters against the database for a specific computer platform.

In step 130, the compatible and/or incompatible configuration parameters of the computer application and the target computer platform are identified. The step identifies those configuration parameters of a computer application which may or may not be compatible with a target computer platform.

In step 140, the compatible and/or incompatible configuration parameters of the computer application and the target computer platform are displayed. A computer output unit, such as, but not limited to, a Virtual Display Unit (VDU), may be used to display the compatible and/or incompatible configuration parameters. Further, the compatible and incompatible configuration parameters may be displayed in a Graphical User Interface (GUI).

The above described method steps may not necessarily be performed in the sequence as outlined above. These steps may be performed in any other sequence as well, with a step(s) being performed prior or later to other method steps.

Figure 2:
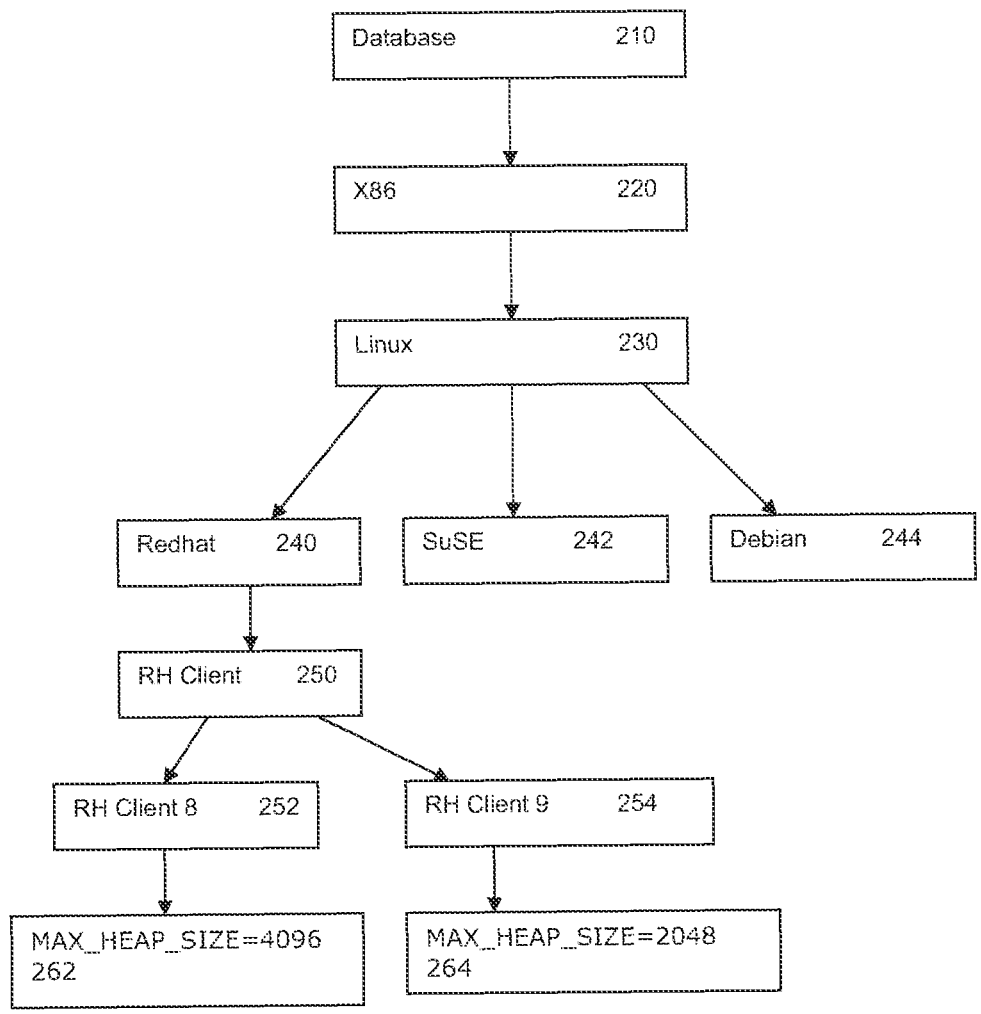
FIG. 2 shows a block diagram of an example of the method of FIG. 1 according to an embodiment.

FIG. 2 shows a block diagram of an example of the method of FIG. 1 according to an embodiment.

In the present example, a database 210 contains configuration parameters for a multiple number of Linux operating system (230) and x86 (220) based computer platforms, such as RedHat (240), SuSE (242) and Debian (244). A computer application, xyz.exe, which uses kernel parameter MAX_HEAP_SIZE is tested for compatibility with Red Hat Linux (RH) computer platforms, RH Clients (250): RH Client 8 (252) and RH Client 9 (254). Upon performing the method steps for RH Client 8, it is found that the computer application (xyz.exe) compiled and built on RH client 8, and is fully compatible with it. On the other hand, for RH Client 9, the computer application (xyz.exe) fails to run. The method steps identifies that computer application (xyz.exe) is compatible with RH Client 8, since the value of MAX_HEAP_SIZE kernel parameter on RH Client 8 is 4096 (262). On the other hand, computer application (xyz.exe) is incompatible with RH Client 9, since the value on the RH Client 9 is 2048 (264). The proposed solution is able to detect such incompatible parameters between a computer application and a computer platform.

Figure 3:
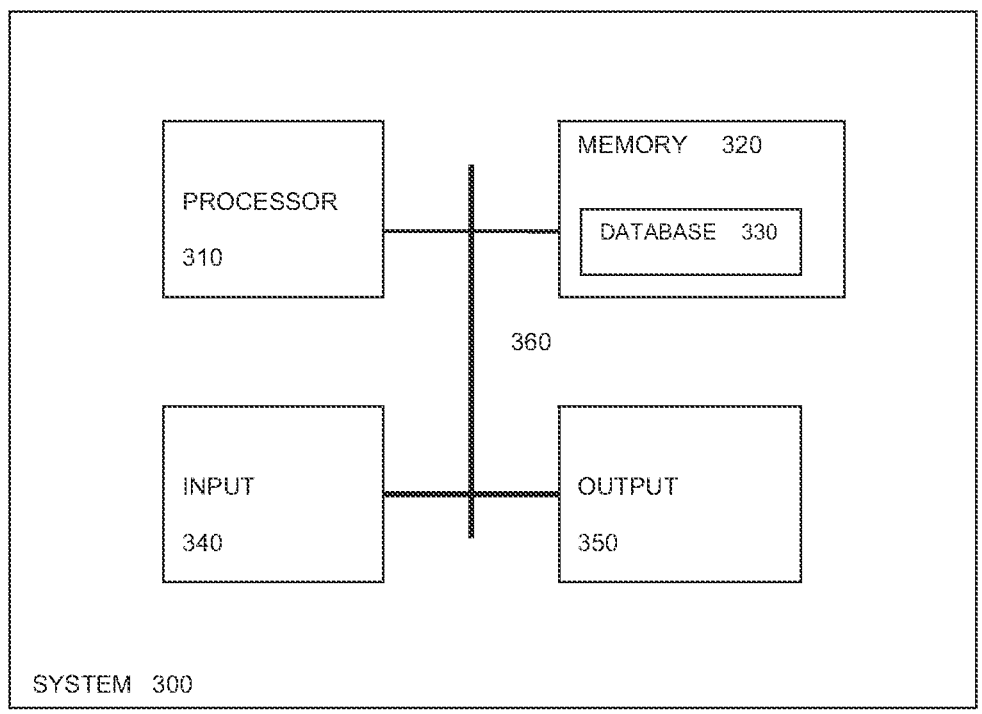
FIG. 3 shows a block diagram of a computing system according to an embodiment.

FIG. 3 shows a block diagram of a computing system according to an embodiment.

The system 300 may be any kind of computing device, such as, but not limited to, a personal computer, a desktop computer, a laptop computer, a notebook computer, a network computer, a personal digital assistant (PDA), a mobile device, a hand-held device, or any other suitable computing. Further, the system 300 may be a standalone system or a network system (such as, but not limited to, a client/server architecture) connected to other computing devices through wired or wireless means.

The system 300 may include a processor 310, for executing software instructions, a memory 320, for storing a database 330, an input device 340 and an output device 350. These components may be coupled together through a system bus 360.

The processor 310 is arranged to receive configuration parameters of a computer application and a plurality of computer platforms, via the input device 340, and to store the configuration parameters in a database 330 in the memory 320. The processor is also arranged to compare configuration parameters of a computer application against the database 330, to determine compatibility between the computer application and a target computer platform.

The memory 320 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 320 stores the database 330 comprising configuration parameters for a plurality of computer platforms including a target computer platform.

The input device 340 may include a mouse, a key pad, a touch pad or screen, a voice recognizer, and the like, for providing configuration parameters of a computer application and computer platforms.

The output device 350 may include a Virtual Display Unit (VDU), a printer, a scanner, and the like, for displaying compatible and incompatible configuration parameters of the computer application and the target computer platform.

It would be appreciated that the system components depicted in FIG. 3 are for the purpose of illustration only and the actual components may vary depending on the computing system and architecture deployed for implementation of the present solution. The various components described above may be hosted on a single computing system or multiple computer systems, including servers, connected together through suitable means.

Figure 4:
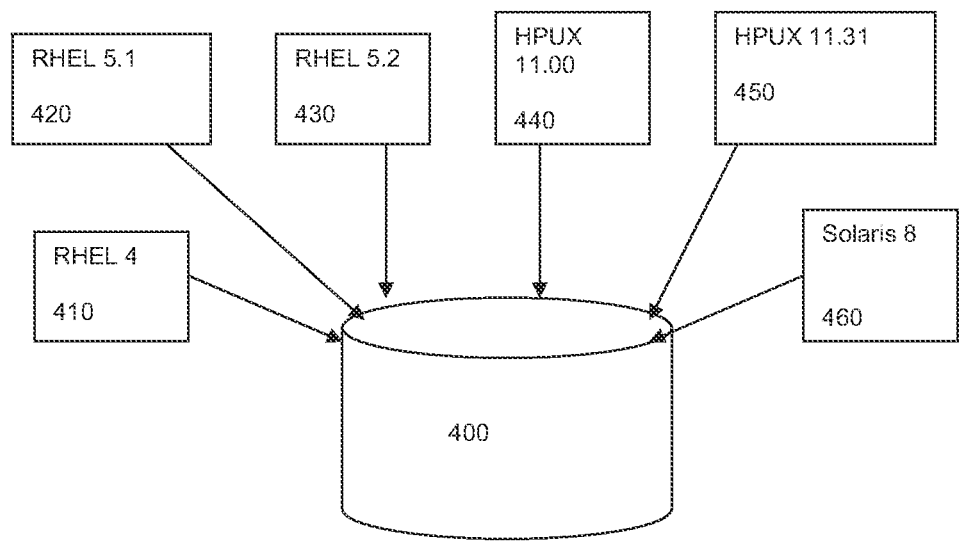
FIG. 4 shows a block diagram of an example of the database of FIG. 3 according to an embodiment.

FIG. 4 shows a block diagram of an example of the database of FIG. 3 according to an embodiment.

In the present example, the database 400 comprises operating system (OS) parameters configuration parameters for a plurality of computer platforms (410, 420, 430, 440, 450, and 460) including the configuration parameters of a target computer platform (for example, any one from 410, 420, 430, 440, 450, and 460). The example includes computer platforms Red Hat Enterprise Linux (RHEL) 4 (410), RHEL 5 (420), RHEL 5.2 (430), HP Unix (HPUX) 11.00 (440), HPUX 11.30 (450) and Sun Solaris 8 (460) against which the application is to be tested for compatibility. The database may be referred as Operating System Configuration Database (OSCDB). The configuration parameters of the operating system include operating system name, version, patch level, system call table, OS libraries and symbols, system variables, system limits, system header files with data structure information, etc.

The embodiments described provide an effective mechanism to point out system dependent artifacts which are different on different OS, thereby helping developers in handling OS incompatibilities proactively and efficiently. Also, platform refresh activities may be restricted to only to those binaries which are reported as incompatible by the embodiments.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system etc. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of testing compatibility between a computer application and a target computer platform, comprising:
   determining configuration parameters of the computer application;
   storing configuration parameters for a plurality of target computer platforms in a database, wherein each of the plurality of target computer platforms has a different operating system;
   identifying a target computer platform from the plurality of target platforms stored in the database to install the computer application;
   determining the configuration parameters for the target computer platform from the database, wherein the configuration parameters for the target computer platform identify system dependent artifacts which are different for different operating systems, and the configuration parameters for the target computer platform include patch level, system call table, operating system libraries, system variables, system limits, and system header files with data structure information;
   compiling and building the computer application on the target computer platform;
   running the computer application on the target computer platform; and
   comparing the configuration parameters of the computer application with the configuration parameters of the target computer platform extracted from the database, the comparing including determining whether the computer application runs or fails to run on the target computer platform; and
   determining whether the configuration parameters of the computer application and the configuration parameters of the target computer platform are compatible or incompatible based on the comparison.

2. A method according to claim 1, wherein the configuration parameters for the plurality of computer platforms are operating system configuration parameters.

3. A method according to claim 1, wherein the configuration parameters of the computer application are obtained from a binary of the computer application.

4. A method according to claim 1, wherein determination of whether the configuration parameters of the computer application and the configuration parameters of the target computer platform are compatible or incompatible is based on pre-defined criteria.

5. A method according to claim 1, further comprising identifying compatible and incompatible configuration parameters of the computer application and the configuration parameters of the target computer platform from the comparison.

6. A method according to claim 5, further comprising displaying the identified compatible and incompatible configuration parameters of the computer application and the configuration parameters of the target computer platform, in a Graphical User Interface (GUI).

7. A method according to claim 1, wherein the database is regularly updated with configuration parameters of the plurality of computer platforms, including the target computer platform.

8. A system, comprising:
   a data storage to store a database, wherein the database comprises configuration parameters for a plurality of target computer platforms;
   an input system to receive configuration parameters of a computer application from a user; and
   a processor to:
      determine the configuration parameters for the target computer platform from the plurality of computer platforms stored in the database, wherein the configuration parameters for the target computer platform identify system dependent artifacts which are different for different operating systems and each of the plurality of target computer platforms has a different operating system, and wherein the configuration parameters for the target computer platform include patch level, system call table, operating system libraries, system variables, system limits, and system header files with data structure information;
      compile and build the computer application on the target computer platform;
      run the computer application on the target computer platform;
      compare the configuration parameters of the computer application with the configuration parameters of the target computer platform extracted from the database, wherein to compare includes to determine whether the computer application runs or fails to run on the target computer platform; and
      determine whether the configuration parameters of the computer application and the configuration parameters of the target computer platform are compatible or incompatible based on the comparison.

9. A system according to claim 8, wherein the configuration parameters for the plurality of computer platforms are operating system configuration parameters.

10. A system according to claim 8, further comprising an output system for displaying compatible and incompatible configuration parameters of the computer application and the target computer platform determined from the comparison.

11. A system according to claim 8, wherein the database is regularly updated with configuration parameters of the plurality of computer platforms, including the target computer platform.

12. A non-transitory computer readable medium storing machine readable instructions run on a computer system to:
   determine configuration parameters of the computer application;
   store configuration parameters for a plurality of target computer platforms in a database;
   identify a target computer platform from the plurality of target computer platforms stored in the database to install the computer application;
   determine the configuration parameters for the target computer platform from the database, wherein the configuration parameters for the target computer platform identify system dependent artifacts which are different for different operating systems and each of the plurality of target computer platforms has a different operating system, and wherein the configuration parameters for the target computer platform include patch level, system call table, operating system libraries, system variables, system limits, and system header files with data structure information;
   compile and build the computer application on the target computer platform;
   run the computer application on the target computer platform;
   compare the configuration parameters of the computer application with the configuration parameters of the target computer platform extracted from the database, wherein to compare includes to determine whether the computer application runs or fails to run on the target computer platform; and
   determine whether the configuration parameters of the computer application and the configuration parameters of the target computer platform are compatible or incompatible based on the comparison.

13. The non-transitory computer readable medium of claim 12, wherein the machine readable instructions further comprise instructions to:
   display compatible and incompatible configuration parameters of the computer application and the target computer platform determined from the comparison.

\* \* \* \* \*

UNITED STATES PATENT AND TRADEMARK OFFICE
CERTIFICATE OF CORRECTION

PATENT NO. : 8,819,636 B2  
APPLICATION NO. : 13/070499  
DATED : August 26, 2014  
INVENTOR(S) : Nitin Harvadan Nagoria et al.

It is certified that error appears in the above-identified patent and that said Letters Patent is hereby corrected as shown below:

In the Claims

Column 6, line 19, in Claim 4, after "pre-defined" insert -- user --.

Column 6, lines 23-24, in Claim 5, delete "comparsion." and insert -- comparison. --, therefor.

Column 7, line 5, in Claim 10, delete "for displaying" and insert -- to display --, therefor.

Signed and Sealed this
Seventeenth Day of February, 2015

Michelle K. Lee
*Deputy Director of the United States Patent and Trademark Office*